United States Patent [19]

LoStracco

[11] Patent Number: 5,220,632
[45] Date of Patent: Jun. 15, 1993

[54] PREPARATION OF AN OPTICAL FIBER CANISTER

[75] Inventor: Gregory LoStracco, Tucson, Ariz.

[73] Assignee: Hughes Aircraft Company, Los Angeles, Calif.

[21] Appl. No.: 903,394

[22] Filed: Jun. 24, 1992

[51] Int. Cl.$^5$ .................. G02B 6/04; B65H 18/28; B65H 69/02

[52] U.S. Cl. ..................... 385/134; 385/135; 385/136; 385/137; 385/147; 242/118.2; 242/166; 242/171; 242/173; 242/175; 242/176; 156/158; 156/166

[58] Field of Search ............... 385/114, 115, 134, 135, 385/136, 137, 147, 141; 242/118, 166, 170, 171, 172, 173, 175, 176, 54 R, 7.02, 118.2; 244/3.12, 3.16; 156/158, 162, 166, 167

[56] References Cited

U.S. PATENT DOCUMENTS

| | | | |
|---|---|---|---|
| 4,883,337 | 11/1989 | Dahlgren | 385/147 |
| 4,935,620 | 6/1990 | Schotter et al. | 250/227.11 |
| 4,955,688 | 9/1990 | Chapin et al. | 385/147 |
| 4,957,344 | 9/1990 | Chesler et al. | 385/134 |
| 5,005,930 | 4/1991 | Schotter | 385/134 |
| 5,058,969 | 10/1991 | Peterson et al. | 385/147 |
| 5,067,665 | 11/1991 | Lo Stracco et al. | 242/117 |
| 5,125,590 | 6/1992 | Le Compte | 242/118.4 |
| 5,154,366 | 10/1992 | Le Compte | 242/47 |
| 5,161,208 | 11/1992 | Christie et al. | 385/147 |

Primary Examiner—Brian Healy
Attorney, Agent, or Firm—R. M. Heald; C. D. Brown; W. K. Denson Low

[57] ABSTRACT

A method for preparing an optical fiber canister includes providing a length of a wire (44) having a diameter of about that of the optical fiber (60), and winding the wire (44) onto a mandrel (40) in a preselected winding pattern to form a base layer (46). A replicating strip (48) having a flexible substrate (50) with a patterning layer (52) of b-staged epoxy on one side thereof is provided, and the patterning layer (52) is pressed against the base layer (46) to form a groove pattern (62) in the patterning layer (52). The b-staged epoxy layer (52) is cured to harden it to preserve the groove pattern, and then the flexible substrate (50) is applied to an optical fiber bobbin (56) with the grooved patterning layer (52) facing outwardly. An optical fiber (60) is wound into the groove (62) of the patterning layer (52) to form an optical fiber pack (66).

19 Claims, 5 Drawing Sheets

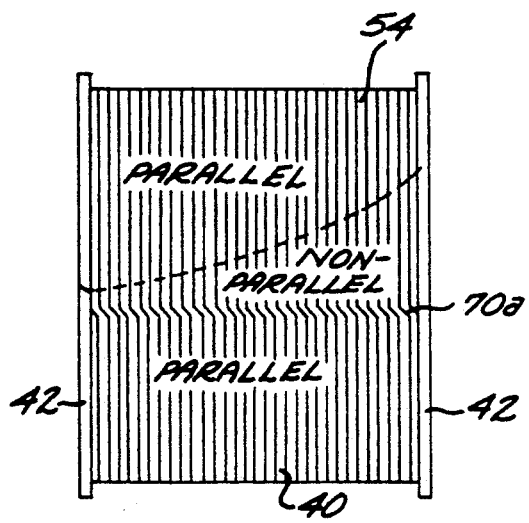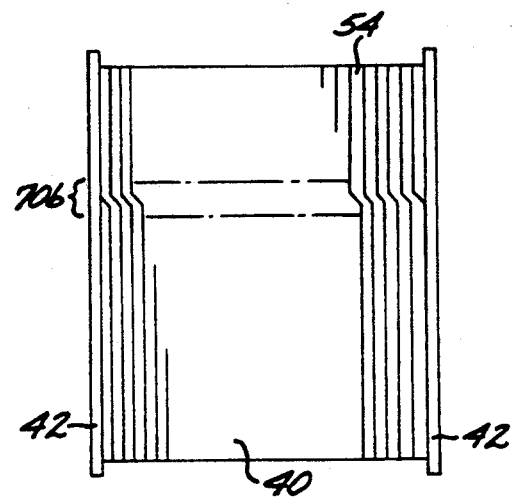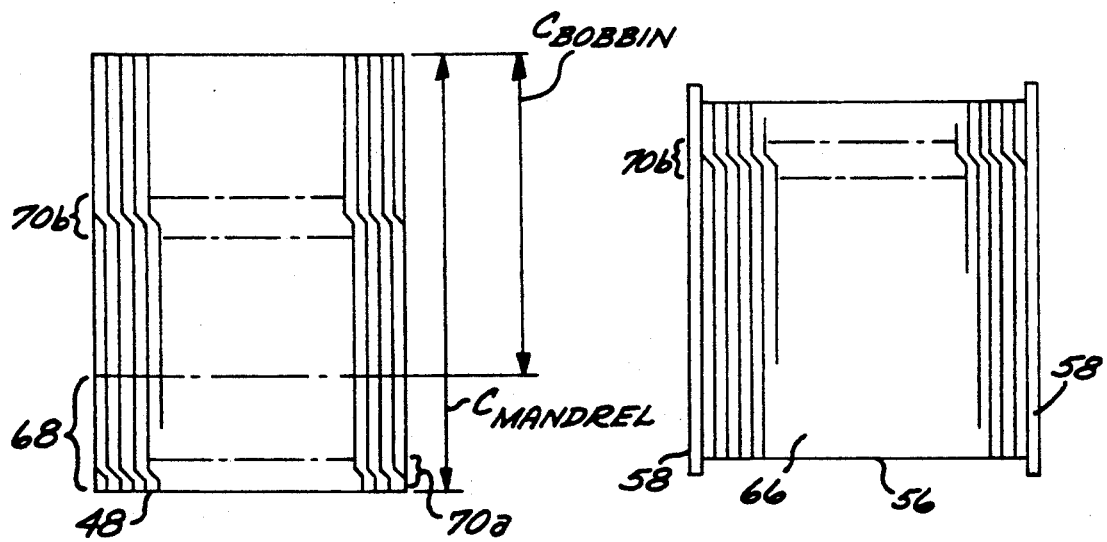

PREPARATION OF AN OPTICAL FIBER CANISTER

BACKGROUND OF THE INVENTION

This invention relates to the preparation of an optical fiber payout canister, and, more particularly, to the formation of the base layer of the canister.

Optical fibers are strands of glass fiber processed so that light transmitted therethrough is subject to total internal reflection. A large fraction of the incident intensity of light directed into the optical fiber is received at the other end of the optical fiber, even though the optical fiber may be hundreds or thousands of meters long. Optical fibers have shown great promise in communications applications, because a high density of information may be carried bidirectionally along the optical fiber and because the quality of the signal is less subject to external interferences of various types than are electrical signals carried on metallic wires. Moreover, the glass fibers are strong, light in weight, and made from a plentiful substance, silicon dioxide.

Glass optical fibers are typically fabricated by preparing a preform of glasses of two different optical indices of refraction, one inside the other, and processing the preform to a fiber. The optical fiber is coated with a polymer layer termed a buffer to protect the glass from scratching or other damage. As an example of the dimensions, in the conventional configuration the diameter of the glass optical fiber is about 125 micrometers, and the diameter of the optical fiber plus the polymer buffer is about 250 micrometers (approximately 0.010 inches). A new generation of even finer optical fibers with reduced buffer thickness is becoming available, having a total diameter of about 175 micrometers (approximately 0.007 inches).

For such very fine optical fibers, the handling of the optical fiber to avoid damage that might reduce its mechanical strength properties becomes an important consideration. In one approach, the optical fibers are wound onto a cylindrical or tapered cylindrical bobbin, generically termed a frustoconical bobbin, with many turns adjacent to each other in a side-by-side fashion. To fabricate such a bobbin, a base layer is first wound on the bobbin surface. The base layer has a pattern that defines the winding pattern of the first optical fiber layer, which is wound on top of the base layer. After one optical fiber layer is complete, another layer of optical fiber is laid on top of the first layer, and so on. A weak adhesive is typically applied to the layers of optical fiber to hold them in place. The final assembly of the bobbin and the wound layers of optical fiber is termed a canister, and the mass of wound optical fiber is termed the fiber pack. When the optical fiber is later to be used, the fiber is paid out from the canister in a direction parallel to the axis of the bobbin.

Experience has shown that the form and pattern of the base layer is key to achieving a high-quality canister. The canister is often exposed to a range of temperatures and other environmental conditions during storage and use. Various types of defects can form in the optical fiber pack, such as pop-ups and folds. These defects can lead to failure of the optical fiber during payout, with even one failure resulting in inoperability of the entire system. A well-formed base layer that gives good lateral support to the first layer of optical fiber aids in stabilizing the optical fiber pack against such defects.

There is therefore an ongoing need for an optical fiber base layer that provides good support for the first optical fiber layer, permits the preparation of optical fiber canisters using a range of optical fiber sizes, and is relatively inexpensive. The present invention fulfills this need, and further provides related advantages.

SUMMARY OF THE INVENTION

The present invention provides a procedure for preparing an optical fiber canister and in particular for forming the base layer for such an optical fiber canister. The base layer of the invention provides a precisely defined groove in which the first layer of optical fiber is wound. The side walls of the base layer groove give good lateral support to the first optical fiber layer, thereby imparting excellent resistance to the introduction of defects into the first layer. The base layer of the invention also may be formed for use with optical fiber diameters smaller than possible with some conventional base layer preparation techniques.

This approach permits avoidance of winding patterns that otherwise might be present in the first optical fiber layer. Winding patterns that are most suitable for winding against a flange of a flanged bobbin may be readily prepared for all diameters of optical fiber. The present approach also can be used to make short-pitch winding patterns for small-diameter optical fiber, which cannot be made by conventional techniques. The base layer is also highly reproducible and relatively inexpensive, as it is prepared using reusable tooling that avoids the need for winding each base layer individually.

In accordance with the invention, a method for preparing an optical fiber canister comprises the steps of winding a base layer form onto a mandrel and forming a negative copy of the upper surface of the base layer form on a flexible substrate. The negative copy has the groove pattern produced by the wound base layer form. The flexible substrate is applied to an optical fiber bobbin with the negative copy and groove pattern facing outwardly, and an optical fiber is wound onto the outwardly facing groove to form an optical fiber pack.

The present approach involves a two-stage replication and application technique. The base layer form is first wound onto a mandrel and replicated. The replication is then applied to the bobbin and the first layer of optical fiber is wound onto the replication.

The base layer form is made with a wire having substantially the same diameter as the optical fiber that is ultimately to be used. The base layer form is wound onto the mandrel, taking care to achieve precisely the same winding pattern as desired for the first optical fiber layer on the bobbin. (Or, as will be discussed, the base layer form may be planned for removal of a portion when the replication is prepared.) The pattern of the base layer form is transferred to a sheet of conformable or deformable material, such as a b-staged epoxy paint, supported on a flexible reinforced substrate. In this case, the epoxy paint is then fully cured to harden it.

After the base layer form is transferred to the flexible material, the flexible material is attached to a bobbin with the pattern of the base layer form on the flexible material facing outwardly. The first layer of optical fiber is wound onto the base layer form, and winding continues to build up the optical fiber pack.

This approach has the important advantages that base layers can be prepared for very fine optical fibers, such as 175 micrometer diameter optical fibers, wound between two flanges. Practical experience has shown that it is difficult or impossible to utilize other base layer techniques with such fine optical fibers in a two-flange configuration. The present approach also produces a semicircular groove profile of the base layer that provides a good fit and lateral support for the first optical fiber layer so that the optical fiber sits relatively deeply in the groove, decreasing the incidence of optical fiber winding defects such as pop-ups. Most other techniques produce rectangular or cycloid-like groove profiles that do not support the first optical fiber layer as well as does the semicircular groove profile, and in which the optical fiber protrudes a much greater distance above the top of the groove.

Great care can be taken to wind the base layer form onto the mandrel, because this form is reproduced multiple times onto a number of bobbins through the replication technique. Reproducibility and uniformity among large numbers of optical fiber canisters is therefore possible, as the same winding configuration is ensured.

This approach also permits the preparation of winding configurations not possible with conventional techniques. To prepare a specially configured winding pattern, the base layer form is wound onto an oversize mandrel, and transferred to a flexible material as previously discussed. When the flexible material is removed from the mandrel, it is in the form of a long strip. One or both ends of the strip can be cut away, removing a portion of the as-originally-would pattern. The ends are removed to remove the nonlinear portion of each molded groove which results from the advancement of one turn of mold wire, by one wire diameter, to the next turn position in the layer of wire. This nonlinear portion is objectionable because it is long and is variable in length for different turns (grooves) along the base layer. The long, variable length, nonlinear turn advancements are replaced by short, constant length advancements molded into the strip at an area separated from the ends.

The flexible-material strip, with a portion excised, is wound onto a bobbin of smaller diameter than the mandrel and aligned. The first layer of optical fiber is wound onto the flexible material in the manner previously described. Thus, the approach of the invention allows a specially configured arrangement, not possible by the use of other techniques, to be prepared. Portions of the as-wound pattern are removed, and improved offsets are introduced.

The present invention permits small diameter optical fibers to be wound between flanges. Another advantage is that the short groove advancements produced by this approach cause crossovers to form spontaneously over these abrupt advancements. The need to "message" (manipulate with a plastic tool about the size of a pencil) the optical fiber layer is reduced or eliminated. Less massaging of the optical fiber pack reduces the likelihood of damage to the optical fiber and reduces the incidence of slumping of the optical fiber pack.

The present invention therefore provides an important advance in the art of optical fiber canister technology. Other features and advantages of the invention will be apparent from the following detailed description of the preferred embodiment, taken in conjunction with the accompanying drawings, which illustrate, by way of example, the principles of the invention.

BRIEF DESCRIPTION OF THE DRAWINGS

FIG. 8 is an elevational view of a front side of a mandrel with a base layer form wound thereon;

FIG. 9 is a second elevational view of the mandrel of FIG. 8, illustrating the back side of the mandrel;

FIG. 10 is a plan view of a flexible substrate illustrating removal of a circumferential portion of the length of the flexible substrate; and FIG. 11 is an elevational view of a bobbin prepared using a flexible substrate produced on a mandrel with two layers of wire, as shown in FIG. 9, and then modified by excision of a portion of the flexible substrate.

DETAILED DESCRIPTION OF THE INVENTION

In accordance with the approach depicted, a method for preparing an optical fiber canister comprises the steps of providing a length of a material having a diameter of about that of the optical fiber and winding the length of material onto the mandrel in a preselected winding pattern. The method further includes the steps of providing a piece of flexible substrate having a patterning layer of b-staged epoxy on one side thereof, pressing the b-staged epoxy against the preselected winding pattern, and curing the b-staged epoxy of the flexible substrate. Preparation of the canister is completed by applying the flexible substrate to an optical fiber bobbin with the cured epoxy facing outwardly and winding an optical fiber onto the outwardly facing pattern of the cured epoxy to form an optical fiber pack.

Figure 1:
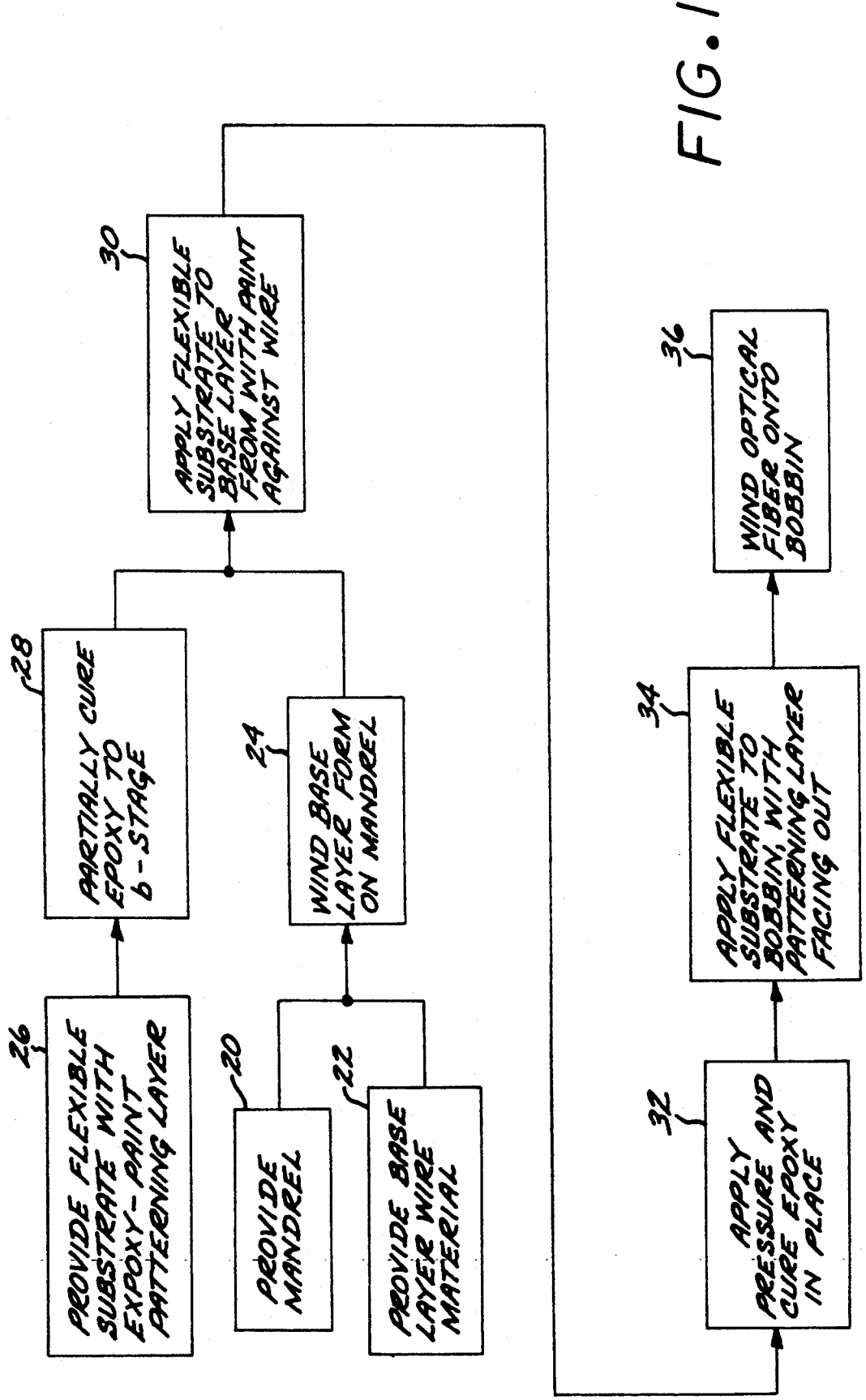
FIG. 1 is a process block diagram for one preferred embodiment of the invention.

FIG. 1 illustrates, in block diagram form, the process for preparing the optical fiber canister. FIGS. 2–6 illustrate aspects of the physical structures associated with the various process steps. A mandrel 40 is first provided, numeral 20. The mandrel 40 (shown in FIG. 2) is, in this embodiment, of the same shape, diameter, and length as the bobbin upon which optical fiber will ultimately be wound. The preferred mandrel 40 is cylindrical or conical with a slight taper of less than about 0 degrees, collectively termed a "frustoconical" shape, and has a flange 42 at each end.

A base layer material 44 is provided, numeral 22. The base layer material 44 is preferably stainless steel wire having a diameter about 1 to 3 percent larger than the optical fiber that will eventually be wound onto the bobbin.

Figure 2:
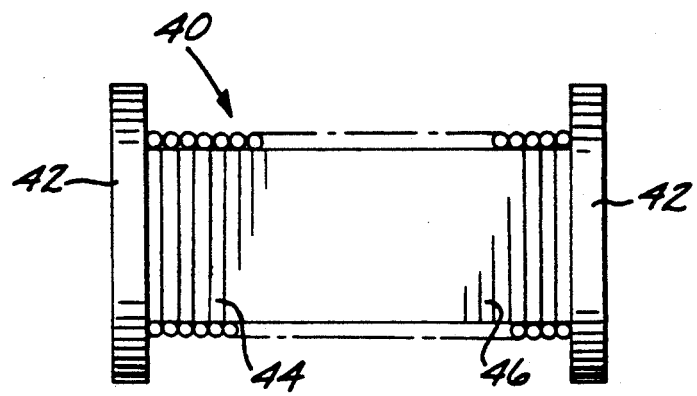
FIG. 2 is an elevational view of a frustoconical mandrel with a base layer form wound thereon.

The base layer material 44 is wound onto the mandrel 40, numeral 24, to create a base layer form 46, as shown in FIG. 2. The base layer form 46 has the pattern desired in the base layer of the optical fiber that is eventually wound upon the bobbin. Since the base layer form 46 need only be prepared a single time using the approach of the invention, great care can be taken to see that it has precisely the correct pattern.

Figure 3:
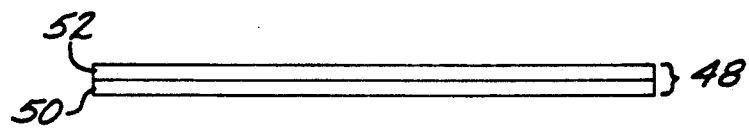
FIG. 3 is a side elevational view of a flexible material substrate with a curable patterning layer thereon.

In a separate operation, a replicating strip 48, shown in FIG. 3, is prepared. The replicating strip has the width of the mandrel 40 between the flanges 42, and a length equal to the circumference of the mandrel 40. The replicating strip 48 is provided, numeral 26, as a flexible substrate 50 with a patterning layer 52 supported thereon. Preferably, the flexible substrate 50 is made of fiberglass about 0.006 inches thick, and the patterning layer 52 is epoxy paint about 0.005 inches thick. The epoxy paint is a curable epoxy dissolved in a solvent. Such epoxy paints conforming to MIL-P-47115, Type 1, are available commercially as Chemplate Missile Finish Type I from Pioneer Paint and Varnish Co., Tucson, AZ.

The epoxy of the patterning layer 52 is partially cured in a procedure known as b-stage curing, numeral 28. The epoxy therefore holds its shape on the substrate 50 and can have a pattern impressed therein. In the preferred approach, the patterning layer 52 on the replicating strip 48 is b-stage cured by heating from 22 C. to 71 C. in 20 minutes, holding at 71 C. for 35 minutes, and cooling to 15 C. in 30 minutes.

Figure 4:
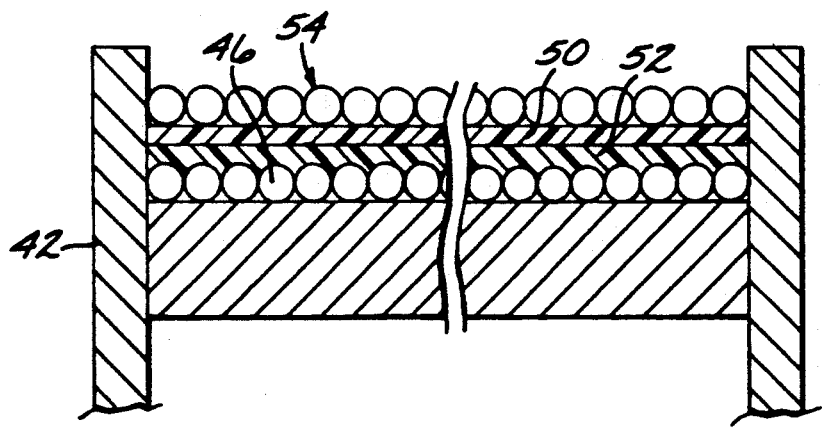
FIG. 4 is an enlarged partial sectional view of the mandrel of FIG. 2 with the flexible material substrate of FIG. 3 wound thereon.
Figure 5:
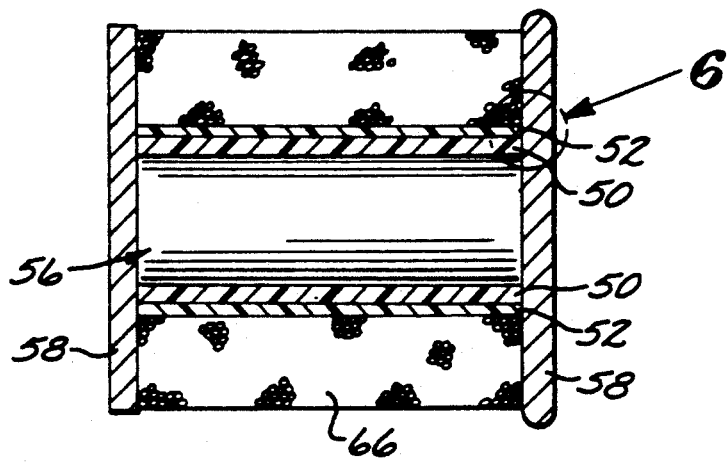
FIG. 5 is a sectional view of an optical fiber bobbin.
Figure 6:
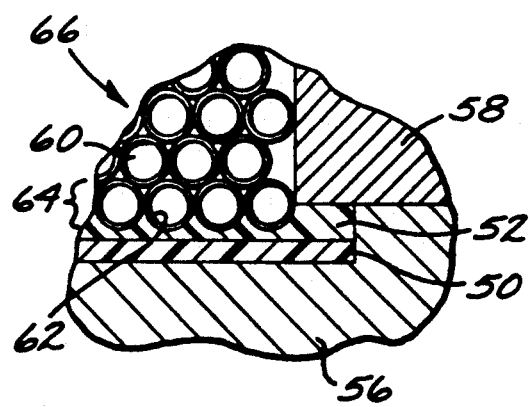
FIG. 6 is an enlarged detail of FIG. 5, taken in the region marked 6, illustrating the flexible material substrate acting as a base layer for the first and subsequent optical fiber layers.

The replicating strip 48 is applied over the mandrel 40 and the overlying base layer form 46, numeral 30 of FIG. 1, in the manner shown in FIG. 4. The replicating strip 48 is applied with the patterning layer 52 facing inwardly in contact with the base layer form 46.

The wound replicating strip 48 is pressed against the mandrel 40 and overlying base layer form 46, numeral 32 of FIG. 1, with an applied pressure. In an approach that has been implemented, the pressure is applied by winding another layer of steel wire 54 over the top of the replicating strip 48, to press against the flexible substrate 50 and thence force the patterning layer 52 into the base layer form 46. However, it is believed this technique may apply nonuniform pressure and that other techniques, such as applying the pressure with an inflated bladder, may produce even better results. The pressured mandrel 40 and replicating strip 48 are then heated to a temperature and held for a time sufficient to fully cure the epoxy of the patterning layer 52, according to the instructions for the particular material of of the patterning layer. For example, in the case of the preferred epoxy patterning layer, full curing is accomplished by heating to a temperature of 71 C. for a time of 3½ hours, and then cooling to ambient temperature. The heating of the b-staged epoxy of the patterning layer 52 softens it, and causes it to conform to the steel wire of the base layer form 46, so that the pattern of the base layer form 46 is permanently impressed into the patterning layer 52.

The replicating strip 48 is stripped from the mandrel 40. Upon inspection, the patterning layer 52 can be seen to have replicated the pattern of the base layer form 46. This procedure can be repeated as many times as necessary to produce additional patterned replicating strips from the same mandrel, as the patterning operation does not damage the mandrel. Stated alternatively, in the process depleted in FIG. 1, the steps 20, 22, and 24 are performed only once, and the remaining steps can be performed repeatedly to produce a large number of patterned replicating strips from the same mandrel. As a result, the cost of providing each base layer and bobbin by this approach is less than other known approaches.

The replicating strip 48 is applied to a bobbin 56 (FIG. 5), numeral 34 of FIG. 1. The bobbin 56 has the same shape, diameter, and length as the mandrel 40, and also has flanges 58 at the ends. The replicating strip 48 is wound onto the bobbin 56 with the flexible substrate 50 against the bobbin surface, and the patterning layer 52 facing outwardly, as shown generally in FIG. 5 and in more detail in FIG. 6.

An optical fiber 60 is wound onto the patterning layer 52, with the optical fiber lying in the groove replicated and preserved in the patterning layer 52, numeral 36 of FIG. 1. Since the steel wire layer 54 originally wound onto the mandrel 40 was selected to have the same round cross-sectional shape and nearly the same diameter as the optical fiber 60, the individual grooves 62 have a semicircular cross-sectional shape into which the optical fiber 60 slips and fits perfectly, with about ½ of the diameter of the optical fiber nested into the grooves. In conventional approaches using a wire base layer, only about 1/6 of the diameter of the optical fiber is nested into the groove. The semicircular grooves 62 of the present invention therefore give excellent lateral support to a first layer 64 of optical fiber that directly contacts the patterning layer 52. This close fit and excellent lateral support aid significantly in avoiding defects associated with temperature changes and vibration. After the first layer 64 of optical fiber is wound onto the bobbin 56, additional layers are wound in a back-and-forth manner to complete a fiber pack 66.

Figure 7:
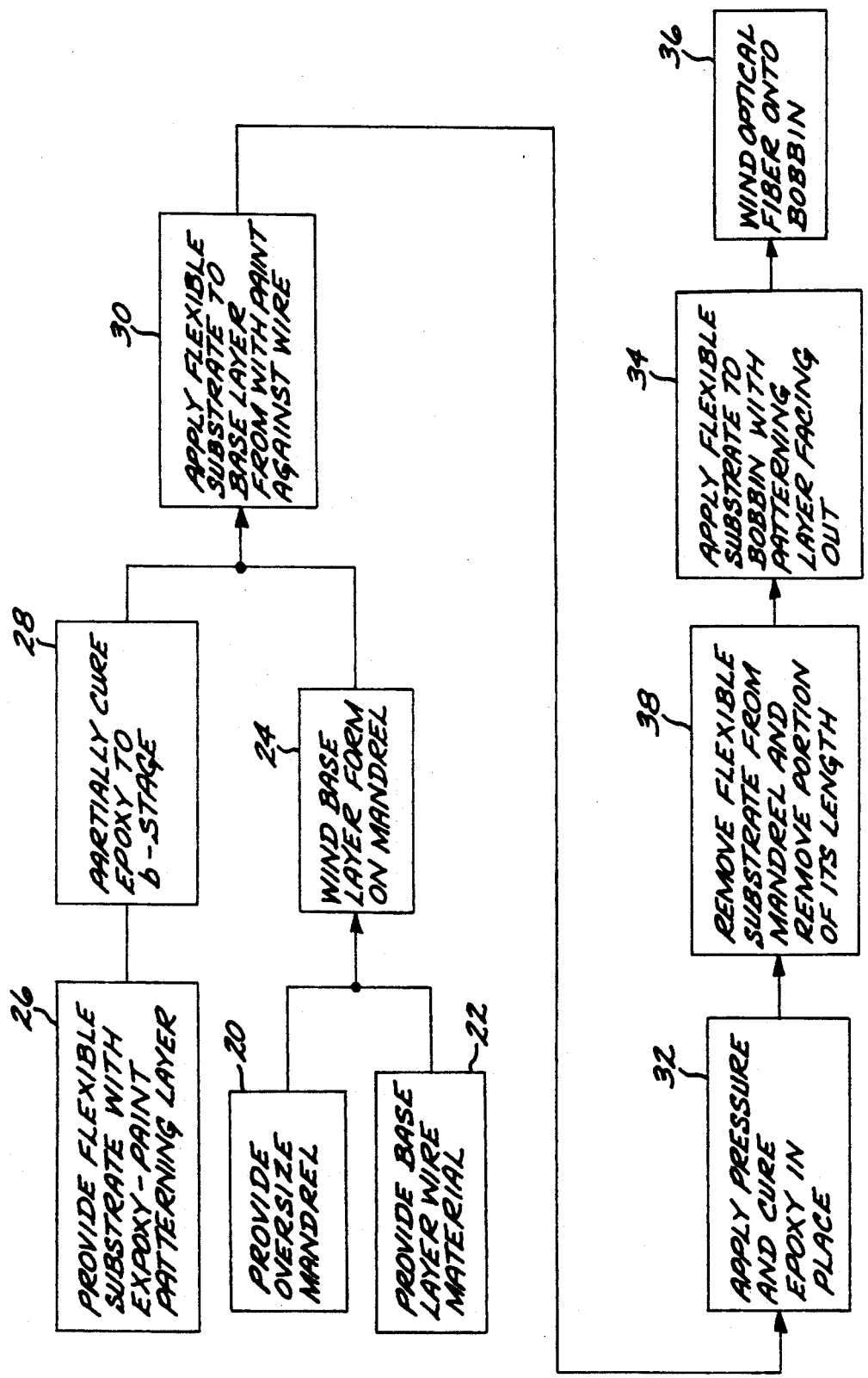
FIG. 7 is a process block diagram for another preferred embodiment of the invention.

FIG. 7 depicts the proces of another embodiment of the invention, which illustrates another important advantage of the invention. In this approach, the steps 20, 22, 24, 26, 28, 30, 32, 34, and 36 are substantially as described previously, with one exception. The mandrel 40, step 20, is provided with a diameter larger than that of the bobbin 56.

The oversize mandrel 40 is used so that a portion of the length of the replicating strip 48 can be removed before it is applied to the bobbin 56, numeral 38 of FIG. 7. The structures produced by this operation are illustrated in FIGS. 8-11. When a bobbin 56 has two oppositely disposed end flanges 58, the optical fiber pack 66 must fit as tightly as possible against the opposite end flanges 58. The individual turns of optical fiber on the bobbin 56 should therefore be parallel to the flanges 58. With the replicating approach of the invention, this means that the turns of wire 54 on the mandrel 40 should also be parallel to the flanges 42. However, in all wire winding geometries, it is observed that, regardless of the amount of care taken to attain a fully parallel winding structure, a pattern of non-parallel wire develops. This non-parallel pattern varies from end to end across the mandrel and cannot be avoided.

The present approach permits the preparation of a winding (base layer) pattern with discrete pitch advancements that attains a nearly fully parallel end winding arrangement. This pattern causes automatic crossover formation in the overlying cable pack layers above the discrete pitch advancements in the base layer and in the first layer of the pack. Automatic crossover formation at a selected location has important advantages for all winding geometries. The resulting pattern is necessary for bobbins with flanges at each end, but also may be utilized for other bobbin designs.

FIGS. 8 and 9 illustrate the wound patterns in the second wire layer wound upon the oversize mandrel 40, as seen when viewing the same mandrel from opposite sides. On one side, there is a region of non-parallel wire turns, as indicated in FIG. 8. The non-parallel region has long and variable length groove (turn) advancements which occur naturally when winding a wire on any cylindrical or conical bobbin surface. On the other side, spaced apart from the non-parallel region by the diameter of the mandrel 40, there is a pattern of discrete advancements, as shown in FIG. 9.

With the present approach, the replicating strip is wound in the manner previously described onto the mandrel 40 having the non-parallel wound regions. The patterning layer 52 is cured, and the replicating strip 48 is removed from the mandrel. The replicating strip 48 is laid out flat on a surface, FIG. 10, and a portion 68 of its circumferential length that contains the non-parallel wound portion is removed and discarded. The replicating strip 48, originally having a length equal to the circumference of the mandrel 40, is shortened to have a length equal to the circumference of the bobbin 56. The replicating strip 48 was wound onto the mandrel 40 so that the non-parallel wound region would be replicated near the end of the replicating strip, as shown, permitting the non-parallel region to be cut out and completely removed. The modified replicating strip is applied to the bobbin 56 in the manner discussed previously and carefully aligned, FIG. 11.

The individual turns of optical fiber on the bobbin 56 cannot be parallel to each other and to the flange 58 completely, or there would be no advancement from turn to turn. In most instances it is desirable that the pitch advancements be made in a discrete manner, so that the steps occur in a short circumferential distance. The result is that the ends of the fiber pack achieve a maximum degree of contact with, and support from, the flange wall.

The present invention provides this pattern, and also the removal of the non-parallel wound region. To accomplish this result, a first layer of wire is wound onto the mandrel, with a non-parallel region appearing in the first layer. A second layer of wire is wound over the first layer. The non-parallel wound region having a pitch advancement 70a is observed in the second layer as well, as shown in FIG. 8. A second discrete pitch advancement 70b (crossover) is formed in the second layer at a circumferential location well separated from the non-parallel wound region, as shown more clearly in FIG. 9. The replicating strip is applied over the second layer of wire, and replicates the second layer of wire, including the non-parallel wound and the discrete pitch advancement. The result is two crossovers in the second layer, the desirable discrete pitch advancement 70b (FIG. 9) and the undesirable and unnecessary non-parallel wound region and its pitch advancement 70a (FIG. 8).

The non-parallel wound region and its unnecessary advancement 70a are removed by removing a portion of the circumference of the replicating strip in the manner discussed, numeral 68 of FIG. 10, leaving the discrete pitch advancement with the individual turns of optical fiber otherwise parallel to each other and the flanges. This structure is then applied to the bobbin 56, and the optical fiber pack is wound onto the bobbin in the manner previously discussed.

Thus, the present approach has the advantage that discrete (short length) pitch advancements can be formed for any size fiber to be wound. No other known approach can produce discrete advancements for small diameter optical fibers.

The present invention has been successfully used to prepare optical fiber bobbins for both 250 micrometer and 160–175 micrometer optical fiber material, with the approach discussed herein. In one example, a 4-inch long, 4.95-inch diameter bobbin with 7.35-inch shim-adjustable flanges was prepared. The steel wire used to prepare the base layer on the mandrel had a diameter of 163 micrometers. The base layer was prepared using the winding approach discussed herein and then replicated. The pressure-application wire wound over the base layer wire during replication was also steel wire of 163 micrometer diameter and was wound under 4 pounds of tension to produce about 200 psi radially inward molding pressure. Up to about 25 layers of an optical fiber of 160 micrometers diameter were wound over the replicating strip on the bobbin. The optical fiber was loaded with 115 grams tension during winding. The resulting bobbin was satisfactory.

Although particular embodiments of the invention have been described in detail for purposes of illustration, various modifications may be made without departing from the spirit and scope of the invention. Accordingly, the invention is not to be limited except as by the appended claims.

What is claimed is:

1. A method for preparing an optical fiber canister, comprising the steps of:
   winding a base layer form onto a mandrel;
   forming a negative copy of the upper surface of the base layer form on a flexible substrate;
   applying the flexible substrate to an optical fiber bobbin with the negative copy facing outwardly; and
   winding an optical fiber onto the outwardly facing groove to form an optical fiber pack.

2. The method of claim 1, wherein the bobbin is cylindrical.

3. The method of claim 1, wherein the bobbin is conical.

4. The method of claim 1, wherein the flexible substrate is made of fiberglass with an applied layer of b-staged epoxy paint thereon, in which the negative copy is made.

5. The method of claim 1, wherein the mandrel has a larger diameter than does the bobbin, and including the further step, after the step of forming but before the step of applying, of
   removing a portion of a circumferential length of the flexible substrate.

6. The method of claim 1, wherein the bobbin is flanged at both ends.

7. The method of claim 1, wherein the optical fiber has a diameter of about 250 micrometers.

8. The method of claim 1, wherein the optical fiber has a diameter of no more than about 175 micrometers.

9. The method of claim 1, wherein the step of winding comprises the steps of
   providing a length of a material having a diameter of about that of the optical fiber, and
   winding the length of material onto the mandrel in a preselected winding pattern.

10. The method of claim 1, wherein the winding pattern includes a plurality of parallel turns with discrete pitch advancements therebetween.

11. A method for preparing an optical fiber canister, comprising the steps of:
   providing a length of a material having a diameter of about that of the optical fiber;

winding the length of material onto the mandrel in a preselected winding pattern;

providing a piece of flexible substrate having a patterning layer of b-staged epoxy on one side thereof;

pressing the b-staged epoxy against the preselected winding pattern;

curing the b-staged epoxy of the flexible substrate;

applying the flexible substrate to an optical fiber bobbin with the cured epoxy facing outwardly; and winding an optical fiber onto the outwardly facing pattern of the cured epoxy to form an optical fiber pack.

12. The method of claim 11, wherein the bobbin is cylindrical.

13. The method of claim 11, wherein the bobbin is tapered cylindrical.

14. The method of claim 11, wherein the flexible substrate is made of epoxy reinforced with fiberglass having an applied layer of b-staged epoxy paint thereon.

15. The method of claim 11, wherein the mandrel has a larger diameter than does the bobbin, and including the further step, after the step of forming but before the step of applying, of removing a portion of a circumferential length of the flexible substrate.

16. The method of claim 11, wherein the bobbin is flanged at both ends.

17. The method of claim 11, wherein the optical fiber has a diameter of about 250 micrometers.

18. The method of claim 11, wherein the optical fiber has a diameter of no more than about 175 micrometers.

19. A method for preparing an optical fiber canister, comprising the steps of:

winding a base layer form onto a mandrel, the base layer comprising
  a first wire layer having a non-parallel wound region, and
  a second wire layer wound over the first wire layer, the second wire layer having a non-parallel wound region with a discrete advancement and a parallel region with a separate discrete advancement;

forming a negative copy of the upper surface of the base layer form on a flexible substrate covered with a b-staged epoxy paint;

excising a portion of a circumferential length of the flexible substrate containing the non-parallel wound region;

applying the flexible substrate to an optical fiber bobbin with the negative copy facing outwardly; and winding an optical fiber onto the outwardly facing negative copy to form an optical fiber pack.

* * * * *